June 11, 1963 F. W. R. STARP 3,093,049
PHOTOGRAPHIC INTRA-LENS SHUTTER CONSTRUCTION
Filed Aug. 29, 1961 3 Sheets-Sheet 1

INVENTOR.
Franz W. R. Starp
BY
Arthur A. March
ATTORNEY

June 11, 1963 F. W. R. STARP 3,093,049
PHOTOGRAPHIC INTRA-LENS SHUTTER CONSTRUCTION
Filed Aug. 29, 1961 3 Sheets-Sheet 2
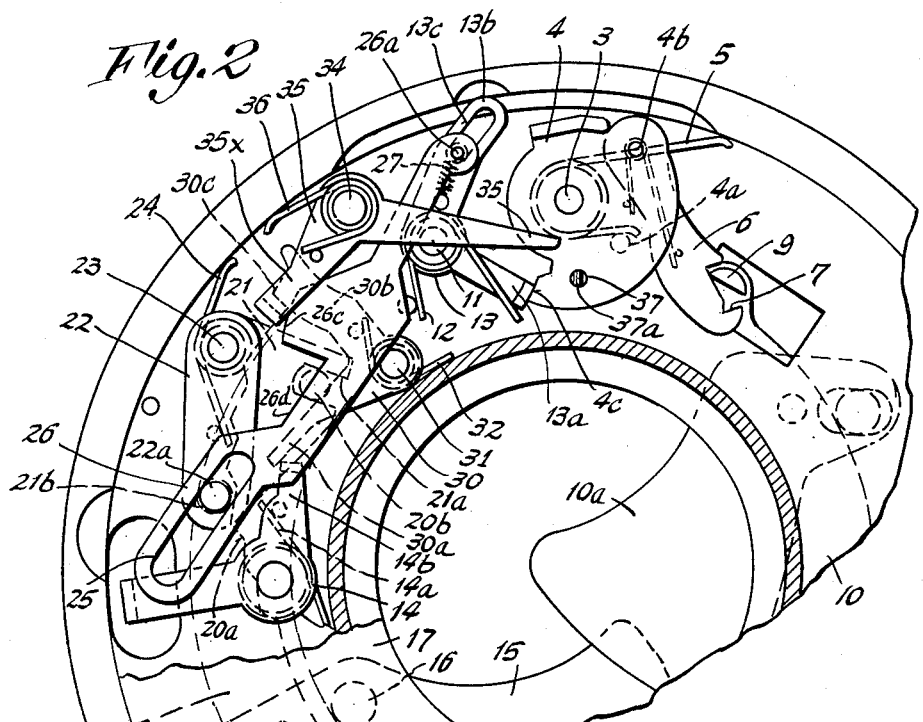
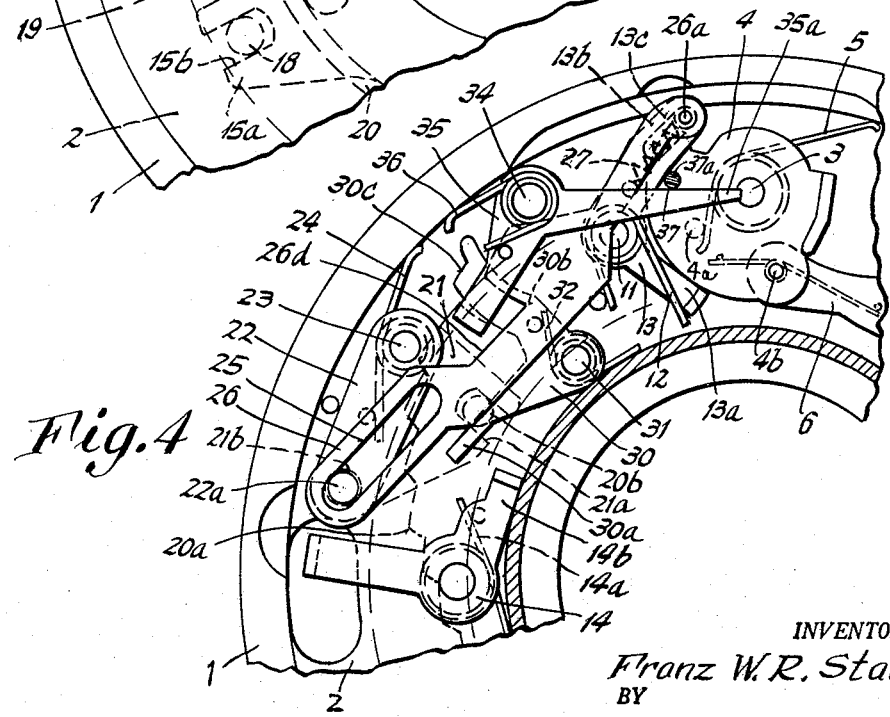
INVENTOR.
Franz W. R. Starp
BY
Arthur A. March
ATTORNEY June 11, 1963   F. W. R. STARP   3,093,049
PHOTOGRAPHIC INTRA-LENS SHUTTER CONSTRUCTION
Filed Aug. 29, 1961   3 Sheets-Sheet 3

INVENTOR.
*Franz W. R. Starp*
BY
*Arthur A. March*
ATTORNEY 3,093,049
PHOTOGRAPHIC INTRA-LENS SHUTTER
CONSTRUCTION
Franz W. R. Starp, Calmbach (Enz), Germany, assignor to
Alfred Gauthier, G.m.b.H., Calmbach (Enz), Germany,
a corporation of Germany
Filed Aug. 29, 1961, Ser. No. 134,658
Claims priority, application Germany Sept. 17, 1960
6 Claims. (Cl. 95—64)

This invention relates to photographic intra-lens shutters of the type incorporating shutter blades and diaphragm segments or lamellas, the diaphragm segments being normally in closed position while the shutter blades are closed, and being actuatable by a diaphragm adjusting ring and set by a preselector device which determines the extent of the opening of the segments prior to opening of the shutter blades, such segments being again closed upon termination of the exposure.

In a well-known shutter of this type, regulation of the diaphragm is effected by employing a driving spring which is connected to the diaphragm adjusting ring and which tends to bias the diaphragm to the open position. The said spring is released or rendered operative in response to actuation of the shutter or camera release member, whereupon the diaphragm adjusting ring turns in the opening direction until it strikes an adjustable stop which has been pre-set in accordance with a diaphragm scale. Also with such construction, the closing of the diaphragm is automatically effected after the termination of the exposure in response to release of the shutter or camera release member, this automatic action being accomplished by making the spring which returns the shutter or camera release member to its inoperative position stronger than the biasing spring of the diaphragm adjusting ring whereby it shifts the latter against the biasing influence to effect closing of the segments. The restoring or return spring for the camera release member, with such arrangement, must be relatively strong or powerful in carrying out the above-described mode of operation, since it is dependent on to overcome the diaphragm biasing spring. Because the said biasing spring must thus be overcome upon removal of the actuating force from the shutter release, this type of shutter is considered as having a "hard" release, and such circumstance may readily cause a picture to be spoiled in consequence of the camera moving during the shutter release operation. Another disadvantage of the above type of shutter resides in the fact that the reclosing of the diaphragm is effected as a consequence of the releasing or letting go of the shutter release member. With such operation it is not possible to carry out exposures utilizing a delayed action device, since these exposures are made by immediately releasing or letting go of the camera release after it has been initially depressed and prior to the delayed action device effecting opening of the shutter.

In order to avoid this inherent defect in the above type of shutter, it has been proposed in the past to arrange the diaphragm segments in a well-known manner on two rings which are positioned coaxially with respect to the shutter axis and which are rotatable about the latter and with respect to each other. In order to preselect the desired diaphragm value, the first ring is adjustable by a manually operable setting member, whereas the second ring experiences a rotation in the same direction and to the same extent as the first ring, by virtue of a driving connection being effected between the said rings. Also, a driving mechanism is provided which can be cocked prior to the release of the shutter and which can be released in response to actuation of the shutter release member, by means of which the second ring is moved relative to the first ring for the purpose of opening the diaphragm to a preselected value.

The above objections and disadvantages of prior shutter constructions of the type outlined are obviated by the present invention, and one object of the invention is to provide a novel and improved shutter construction of the general type set forth, wherein the diaphragm segments need be shifted by but a single setting or adjusting ring while at the same time there is had a desirable simplicity of the structure and a dependable and reliable mode of operation as regards the actuation of the shutter or camera release member, the improved camera construction being also characterized by a "soft" release action wherein the energy required to depress the shutter or camera release is no more than that required in conventional well-known shutters. The construction is further characterized by reclosing of the diaphragm only after termination of the exposure, without regard to the releasing or "letting go of" the camera or shutter release.

This is accomplished, in accordance with the invention, by the provision of a novel setting and actuating, elongate bridge member which not only effects a setting or actuation of the diaphragm segments but also thereafter effects a release of the shutter mechanism for carrying out the exposure. The said bridge member at one end acts either indirectly or directly on the diaphragm adjusting ring whereas its other end acts on a locking member which retains the driving member of the shutter mechanism in its cocked position. The construction also provides a second driving member which is associated with the said bridge (being also hereinafter referred to as a "bridge-driving member"), the said second driving member being spring-powered and released for running down (bridge actuating) movement in response to the actuation of the shutter or camera release member. Under the action of such bridge-driving member the setting and actuating bridge experiences first a lateral or pivoting movement about its point of connection to the said locking member, during which movement the diaphragm adjusting means is actuated until halted by an adjustable stop of the diaphragm preselection device. After such halting of the initial pivotal movement of the bridge, the latter thereafter experiences a second lateral or pivotal movement under the influence of the bridge-driving member, this time about its connection point to the diaphragm adjusting means as an axis, during which second pivotal movement the said locking member is disengaged from the driving member of the shutter drive mechanism, releasing the latter for running down movement to open and again close the shutter blades. Upon completion of such running down movement of the shutter driving mechanism the driving member thereof (after reclosure of the shutter blades has been effected) effects a shifting of the said bridge member into a predetermined position wherein it can no longer dominate the diaphragm setting mechanism. Accordingly, the diaphragm adjusting ring under the action of its biasing spring is enabled to return to its starting position by which the diaphragm segments are reclosed.

It is thus seen that in a camera shutter construction as provided by the invention, the shutter release member is not depended upon to actuate (open and reclose) the diaphragm itself, but instead merely releases a spring-charged driving member which then effects the setting of the diaphragm at first and thereafter effects the release of the shutter. This has the advantage that only comparatively little energy or force is required to actuate the shutter release member, whereby it is much easier to hold the camera motionless during the effecting of an exposure. In addition to such advantage, the shutter as thus constructed in accordance with the invention has the further advantage that the return of the diaphragm segments to their closed positions takes place independently of the release or "letting go of" the camera release member, and such reclosing occurs only after the exposure has been completed and terminated. This is of special importance where exposures are to be made utilizing a delayed action device which requires that the shutter release member be released or "let go of" prior to the exposure being effected.

In order to obtain a desirable flexibility in the design and construction of the shutter, the invention provides a pivotal transmission means, on which the setting and actuating bridge member acts and which transmission means is drivingly connected to the diaphragm adjusting ring.

Moreover, the present device can be readily adapted to a particular shutter construction, by arranging the transmission means in the form of two levers fixedly carried by a common axis and movable in parallel planes, one of said levers cooperating with the bridge member and the other one being cooperable with the diaphragm adjusting ring.

It is possible to obtain an extended path of movement of the diaphragm preselection device, and hence an expanded setting scale for the diaphragm which insures easy readability and accurate setting, by arranging the adjustable stop for the diaphragm adjusting ring as a cam which is engageable with one of the said two levers, as for example the lever associated with the diaphragm adjusting ring.

A further construction as provided by the invention, whereby the diaphragm is restored to its closed condition after completion of an exposure in a simple and dependable manner, involves pivotally connecting the bridge by means of pin-and-slot connections with one of the levers of the transmission means and with the locking member, and by providing an abutment edge on the bridge with a notch therein for engagement by the bridge-driving member to effect the lateral bridge movement. The means which returns the diaphragm segments to their closed positions includes the said pin-and-slot connections and the notch in the abutment edge, whereby an endwise movement of the bridge member, effected as a consequence of such member being shifted by the driving member of the shutter mechanism after termination of an exposure, enables the bridge member to eventually move laterally. Such eventual lateral movement of the bridge enables the diaphragm actuating means to close the segments.

A construction which is simple, dependable and saving in space is had when the driving member is constructed in the form of a two-armed lever which is cocked simultaneously with cocking of the shutter driving mechanism, one arm of such lever cooperating with the driving member of the shutter mechanism whereas the other arm acts on an abutment edge of the bridge member.

Details of the invention will become apparent from the specification which follows and from the accompanying drawings, wherein there is illustrated one embodiment of the invention comprising an intra-lens shutter construction shown in different positions in the various figures. All structural members of the shutter construction which are not essential to an understanding of the invention have been omitted for the sake of clarity of illustration.

FIG. 2 is a view similar to that of FIG. 1 but showing a diaphragm segment opened to a preselected value, the shutter still remaining closed.

FIG. 4 is also a similar view, but showing the components of the shutter construction after termination of an exposure, the shutter and the diaphragm being again in their closed positions.

Figure 1:
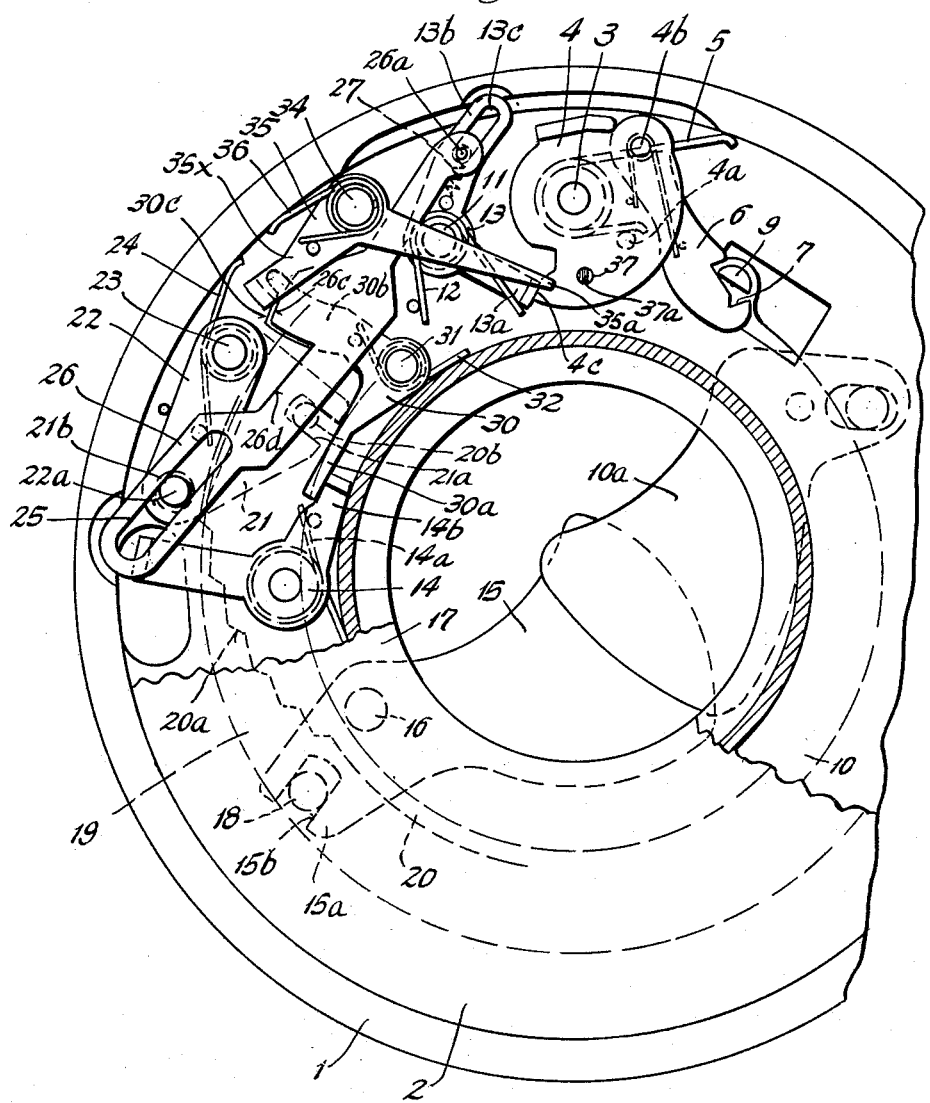
FIG. 1 is a fragmentary view partly in front elevation and partly in vertical section of an intra-lens shutter construction with the cover plate removed and with the diaphragm and shutter shown in their closed positions.

Referring now to the drawings, the housing of the photographic intra-lens shutter construction is indicated by the numeral 1. Within the housing 1 there is the usual base plate 2, for positioning the individual members of the shutter construction. Carried on the base plate 2 about an axis 3 is a cocking and driving disc 4 of the shutter drive mechanism, the said disc in conjunction with a known cocking device (not shown herein) enabling the shutter driving spring 5 to be cocked or stressed. The shutter driving spring 5 is constructed in the form of a spiral coil, having one end engaged with the inner wall of the housing 1 and the other end abutting a pin 4a provided on the cocking and driving disc 4. Pivotally connected to the disc 4 by a pin 4b is a driving link 6. The link 6 has jaws 7 defining a notch which receives a semi-circular driving pin 9 affixed to the shutter blade ring 10, the latter being rotatably mounted on the rear of the base plate 2. The shutter blade ring 10 serves in a well-known manner to actuate the shutter blades 10a for opening and closing the shutter in response to reciprocative movement of the ring. It will be understood that a clockwise driving movement of the driving disc 4 from the position shown in FIG. 1 under the force supplied by the spring 5 will cause the pivot pin 4b thereof to describe an arc, whereby the link 6 is first pushed against the pin 9 to effect clockwise turning of the shutter blade ring 10 and thereafter pulled against the pin to reverse the movement of the blade ring 10, effecting a counterclockwise turning thereof. The reciprocation of the shutter blade ring 10 results in the blade 10a being first opened and thereafter closed.

For the purpose of retaining the driving disc 4 in the cocked position shown in FIGS. 1 and 2 there is provided a locking member in the form of a two-armed arresting lever 13 which is biased in a counterclockwise direction by a coil spring 12, the said lever being pivotally movable about an axis 11 carried by the shutter base plate 2. One arm 13a of the member 13 cooperates with a lug or projection 4c provided on the driving disc 4 whereas the other arm 13b cooperates with the camera release lever 14 of the shutter construction, by means of a device which will be explained below.

As is apparent from the drawings, the diaphragm segments 15 (only one of which is shown for reasons of clarity of illustration) are pivotally positioned on pins 16 carried by a fixed ring 17. End portions 15a of the diaphragm segments 15 have slots 15b which receive driving pins 18 of a diaphragm adjusting ring 19 which is rotatable with respect to the ring 17. The fixed ring 17 is arranged to be coaxial with the diaphragm adjusting ring 19. When the latter ring is rotated in a clockwise direction, the diaphragm segments 15 will swing radially outward to effect an opening of the diaphragm. Considering FIG. 1, the segment 15 shown therein will swing in a clockwise direction about the fixed pivot pin 16, to effect such opening of the diaphragm.

In order to obtain a presetting of the diaphragm at a desired value, the invention provides an adjustable cam or control disc 20 which is arranged to be coaxial with the shutter axis, such disc having on its outer edge a stepped configuration 20a constituting a stepped cam. The arrangement is such that, as the setting disc 20 is shifted in a clockwise direction beyond a certain point, the diaphragm aperture steadily becomes reduced from a maximum value. Further, in order to obtain the desired diaphragm values, the edge 20a may be either provided with the steps or gradations shown or else may be constituted as a continuous or stepless, smooth edge. The setting disc 20 may be adjusted by any suitable well-known means, either manually or automatically, as will be understood.

Figure 3:
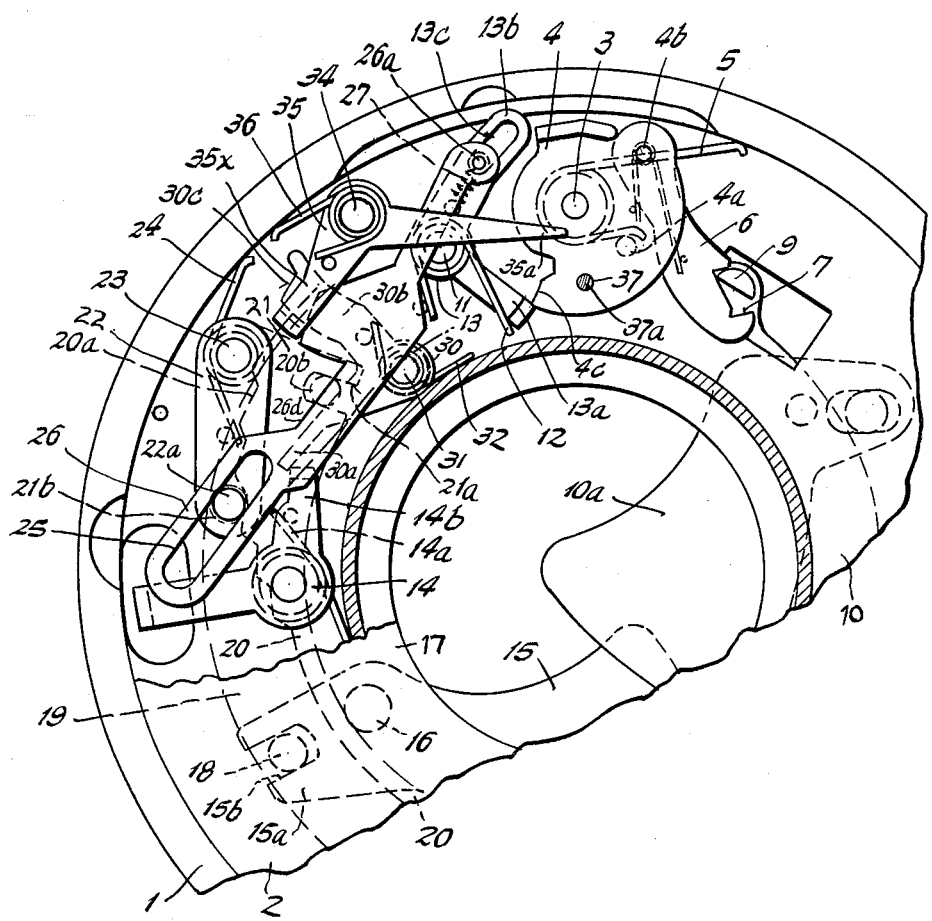
FIG. 3 is a view similar to that of FIGS. 1 and 2 but showing the shutter drive mechanism as having been just released, with the diaphragm in its adjusted open position.

A transmission means which serves to drive and bias the diaphragm adjusting ring 19 is arranged to cooperate with the cam edge 20a of the cam disc 20. The transmission means, in the illustrated embodiment of the invention, is constituted of two juxtaposed levers 21 and 22 arranged in spaced relation on and affixed to a common axis or shaft 23, the said levers being simultaneously movable in parallel planes. The shaft 23 is turnably mounted on the base plate 2 of the shutter housing. One lever 21 of the transmission means is, in the illustrated embodiment, constructed in the form of a triangular plate and has a pin-and-slot connection 20b, 21a with the diaphragm adjusting ring 19. The lever 21 carries a pin 21b which is coaxial with a pin 22a provided on the second lever 22, the latter being located in front of the lever 21 as seen in FIG. 1. The coaxial relationship of the pins 21b and 22a is not a prerequisite to the proper functioning of the transmission means, however, as will be understood. The pin 21b is engageable with the stepped edge 20a of the cam ring 20, whereas the pin 21b is received in a slot 25 of an elongate bridge member 26 which functions to set or adjust the diaphragm and also to release the shutter driving member 4. The transmission means 21, 22 is biased in a clockwise direction by a coil spring 24, as shown, which accordingly biases the ring 19 counter-clockwise to effect smaller diaphragm apertures. The bridge member 26 serves to operably connect the transmission means 21, 22 with the arm 13b of the locking lever 13. For this purpose, the bridge 26 has at its remaining end a pin 26a, which is received in a slot 13c provided in one arm 13b of the locking member 13. For the purpose of retaining the bridge 26 in an initial or starting position as shown in FIGS. 1–3, a tension spring 27 is provided, which biases the bridge longitudinally or endwise and downward. The spring 27 may be connected to the arm 13b of the locking member 13 and at its other end to the pin 26a of the bridge member 26.

An arresting lever 30 cooperates with the camera release lever 14 of the shutter construction, and is biased in a counterclockwise direction by a coil spring 32. The shutter release lever 14 is biased in a clockwise direction by a spring 14a. The arresting lever 30 is rotatable about a fixed axis 31 carried on the base plate 2, and is constructed in the form of a bell crank. One arm 30a of the lever 30 engages the arm 14b of the camera release lever 14, such action being maintained by the spring 32. Preferably, as shown, the end of the lever arm 14b is bent to provide a lug for this purpose. The remaining arm 30b of the arresting lever 30, which extends generally at right angles to the arm 30a, is located approximately in a radial position as regards the axis of the shutter construction, and has an abutting or supporting edge 30c at its outermost portion or end.

For the purpose of driving the above-described bridge and associated mechanism, a two-armed bridge-driving lever 35 is provided, rotatably carried by an axis 34. As shown in FIGS. 1–3, one arm 35x of the lever 35 has a laterally bent end portion or lug which rests under force on the supporting edge 30c of the arresting lever 30, and which is movable downward and to the right in an arc when the edge 30c is removed. This action enables the driving member 35 to shift the bridge 26 laterally or pivotally under suitable conditions, as will be shortly described. The driving member 35 is biased in a counter-clockwise direction by a coil spring 36. Counter-clockwise actuation of the shutter release lever 14, resulting in clockwise pivotal movement of the arresting lever 30 causes the supporting edge 30c thereof to shift to the right, out of engagement with the arm 35x of the driving member 35, thereby freeing the latter for action against the bridge member 26.

Juxtaposed to the supporting edge 30c of the arresting lever 30 is an abutment edge 26c provided on the bridge member 26 for engagement with the driving lever 35, such edge being adjacent the center portion of the bridge. The edge 26c is thus located in the path of movement of the arm 35x of the driving member 35. The bridge 26 also has a notch 26d which is arranged to receive the arm 35x of the driving member 35 upon the bridge being shifted end-wise and upward as viewed in FIG. 1.

For the purpose of cocking the driving member 35 simultaneously with cocking of the shutter, such member has an arm 35a which cooperates with a pin 37 extending laterally from the cocking and driving disc 4 of the shutter drive mechanism. The pin 37 has a front inclined face 37a which may function as a cam to shift the lever arm 35a laterally out of its path of travel during the clockwise running down movement of the shutter driving disc 4. However, on the return or cocking movement of the driving disc 4, the pin 37 effects a driving connection with the lever arm 35a, and shifts the lever 35 in a clockwise direction to effect the cocking thereof. The arm 35a of the lever 35 is resilient or flexible to readily shift laterally of its plane of motion, and is shaped so that it may absorb the moment of rotation or torque which is stored in the spring 36 of the driving member 35 during the cocking process of the cocking and driving disc 4.

The mode of operation of the above-described shutter construction is as follows:

*(a) Setting of the Diaphragm*

In order to preselect a specific diaphragm value, a manually operable setting member (not shown in the drawing) which is connected with the cam disc 20 is adjusted until the proper indication is had on a diaphragm scale, as to the desired diaphragm aperture. In response to such adjustment of the setting member, the cam edge 20a of the disc 20 is shifted into a specific relative position with respect to the pin 21b of the transmission means 21, 22, thereby establishing or fixing the maximum extent of pivotal movement of the said transmission means. The further that the cam ring 20 is shifted in a clockwise direction, for example, from the position shown in FIG. 1, the further the transmission means 21, 22 is able to swing in a counterclockwise direction until it engages the stop 20a, and the larger will be the diaphragm aperture. The counterclockwise turning movement of the transmission means 21, 22 effects the opening movement of the diaphragm segments 15 through the medium of the diaphragm actuating ring 19 and the pin-and-slot connection 20b, 21a.

*(b) Cocking of the Shutter*

This process is effected in a well-known manner by actuating a well-known cocking device (which is not shown in the drawing). The cocking an ddriving disc 4 is rotated in a counterclockwise direction by such actuation, and its driving spring 5 as well as the spring 36 of the driving member 35 is stressed. For such condition, the individual structural members or components of the shutter will occupy the positions shown in FIG. 1.

*(c) Releasing the Shutter*

The releasing process is initiated in the usual manner by actuating the shutter release lever 14 which, in the illustrated embodiment of the invention, pivots in a counterclockwise direction for this purpose. Such motion of the camera release member 14 imparts to the arresting lever 30 an oppositely directed rotary motion (or clockwise turning motion) about its axis 31. The arm 35x of the spring loaded driving member 35 is being supported by the supporting edge 30c of the arresting lever 30 during the first phase of movement of the arresting lever. However, as soon as the arm 30b of the arresting lever 30 has been shifted out of engagement with the arm 35x of the driving member 35, the said arm 35x becomes engaged with the abutting edge 26c of the bridge 26, shifting the bridge pivotally or laterally, specifically in a counterclockwise direction about the axis 26a which is engaged with the locking member 13. Hereinafter and in the appended claims the term "lateral" as applied to such movement of the bridge member 26 is intended to include pivotal movement of the bridge 26 about either of its pivotal end connections, as distinguished from endwise movement of the lever which is permitted mainly by the existence of the slots 25 and 13c located respectively in the bridge 26 and the locking member 13. By virtue of the pin-and-slot connection 22a, 25 between the bridge 26 and the transmission means 21, 22 the transmission means must participate in the lateral motion of the bridge 26 and in so doing it rotates the diaphragm adjusting ring 19 in a clockwise direction. Such rotary movement of the diaphragm adjusting ring 19 results in the diaphragm segments 15 swinging outward about the pivots 16 on the fixed bearing ring 17. The extent of movement of each of the diaphragm segments is dependent on the extent of movement of the transmission means 21, 22 as determined by engagement of the pin 21b thereof with the stepped edge 20a of the setting cam disc 20.

After the bridge 26 has been halted in its counterclockwise movement by such engagement between the pin 21b and the cam edge 20a, the continuing force exerted by the driving member 35 now has the effect of causing a further lateral movement of the bridge 26, this being in a clockwise direction about the pin 22a of the transmission means 21, 22. By virtue of the pin-and-slot connection 26a, 13c between the bridge 26 and the locking member 13, the latter is now forced to participate in the said lateral or clockwise movement of the bridge 26 and in so doing it is rotated in a clockwise direction about its axis 11 as shown in FIG. 3. This releases the shutter driving disc 4 whereby the drive mechanism for the shutter blades becomes operative, to effect an opening and a subsequent closing of the shutter blades 10a.

The clockwise running down movement of the driving disc 4, effecting the opening and closing of the shutter blades 10a under the action of the driving spring 5, now causes a reclosing of the diaphragm segments 15. This occurs, however, only after the shutter blades have been reclosed, and involves the end phase or terminal movement of the driving disc 4. Such terminal movement results in the lug 4c of the disc 4 engaging the pin 26a of the bridge 26 whereby the latter is shifted endwise, upward and to the right, as is clearly seen in FIG. 4. This is a longitudinal movement of the bridge 26, as distinguished from the lateral or pivotal movement effecting the diaphragm adjustment and the release of the shutter driving disc 4. The endwise movement of the bridge 26 is sufficient to disengage the abutting edge 26c thereof from the driving member 35 whereby the arm 35x may now occupy the notch 26d in the bridge, as shown in FIG. 4. For such position of the bridge 26, the transmission means 21, 22 is again free and able to swing back in a clockwise direction under the influence of the spring 24 acting upon it. This, in turn, causes the diaphragm adjusting ring 19 to be returned to its starting position, and causes the diaphragm segments 15 to return automatically to the closed positions as shown in FIG. 1.

Upon the subsequent cocking of the shutter mechanism, the pin 37 of the driving disc 4 first engages the upper edge of the arm 35a of the driving member 35 and shifts the latter in a clockwise direction about the pivotal axis 34. When the driving member 35 has been shifted sufficiently to enable the arm 35x thereof to clear the abutting edge 26c of the bridge 26 and also to clear the supporting edge 30c of the resting lever 30, the said bridge and the arresting lever 30 are able to return to the starting positions shown in FIG. 1 under the influence of their respective springs 27 and 32, whereby the driving member 35 again comes to rest on the supporting edge 30c of the arresting lever 30 with the arm 30a of the arresting lever engaging the camera release lever 14.

I claim:
1. In a photographic intra-lens shutter construction having a manually operable shutter release, in combination, shutter blades; a blade actuating mechanism including a powered cocking and driving member, for opening and closing the shutter blades; diaphragm segments; means including a diaphragm adjusting ring, for shifting the diaphragm segments; a diaphragm preselection device including an adjustable stop, cooperable with the diaphragm segment shifting means; an elongate setting and actuating bridge at one end pivotally connected to the diaphragm segment shifting means; a locking member pivotally connected to the other end of the bridge and adapted to retain the said powered driving member in cocked position; a spring-powered bridge-driving member for imparting lateral movement to the bridge; means responsive to operation of the shutter release, for releasing the bridge-driving member to effect lateral movement of the bridge whereby the latter first swings about the pivotal connection to the locking member to actuate the diaphragm segment shifting means for effecting adjustment of the diaphragm and thereafter swings about the pivotal connection to the diaphragm segment shifting means to effect actuation of the locking member so as to release the cocking and driving member for opening and closing of the shutter; and means responsive to termination movement of the cocking and driving member, for actuating the diaphragm segment shifting means to return the diaphragm segments to their closed positions.

2. A shutter construction as in claim 1, wherein there is a pivotal transmission device included in the means for actuating the diaphragm segments, said device being drivingly connected to the diaphragm adjusting ring and to the bridge.

3. A shutter construction as in claim 2, wherein the transmission device comprises two fixedly-related levers movable in parallel planes and arranged on a common axis, one of said levers cooperating with the bridge and the other with the diaphragm adjusting ring.

4. A shutter construction as in claim 3, wherein the preselection device comprises a cam engageable with one of the said two levers.

5. A shutter construction as in claim 1, wherein the pivotal connections to the bridge comprise slots to provide for endwise translational movement of the bridge as well as pivotal movement, wherein the bridge has an abutment edge provided with a notch, said edge being arranged for engagement by the bridge-driving member to effect the lateral bridge movement, and wherein the means for returning the diaphragm segments to their closed positions include the said slots and notch and include a driving connection between the shutter driving member and bridge to effect endwise movement of the latter whereby the bridge-driving member is received in the said notch, enabling the bridge to eventually have a lateral return movement.

6. A shutter construction as in claim 1, wherein the bridge-driving member comprises a two-armed lever which is cocked simultaneously with cocking of the shutter-driving member, said lever having one arm which is cooperable with the shutter-driving member whereas the other arm is cooperable with the said bridge.

References Cited in the file of this patent
UNITED STATES PATENTS
2,777,371   Schutz _____ Jan. 15, 1957